United States Patent
Foley et al.

(10) Patent No.: US 10,397,279 B2
(45) Date of Patent: *Aug. 27, 2019

(54) DIRECTING AUDITED DATA TRAFFIC TO SPECIFIC REPOSITORIES

(71) Applicant: International Business Machines Corporation, Armonk, NY (US)

(72) Inventors: Sean C. Foley, Chelmsford, MA (US); Ury Segal, Vancouver (CA); Shidong Shan, Richmond (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/849,548

(22) Filed: Dec. 20, 2017

(65) Prior Publication Data

US 2018/0139243 A1    May 17, 2018

Related U.S. Application Data

(63) Continuation of application No. 15/790,027, filed on Oct. 22, 2017, now Pat. No. 10,110,637, which is a
(Continued)

(51) Int. Cl.
*G06F 21/00* (2013.01)
*H04L 29/06* (2006.01)
(Continued)

(52) U.S. Cl.
CPC .............. *H04L 63/20* (2013.01); *H04L 43/08* (2013.01); *H04L 63/105* (2013.01); *H04L 63/14* (2013.01);
(Continued)

(58) Field of Classification Search
None
See application file for complete search history.

(56) References Cited

U.S. PATENT DOCUMENTS

| 6,263,341 B1 * | 7/2001 | Smiley | G06F 17/30604 |
| | | | 707/812 |
| 6,272,640 B1 * | 8/2001 | Sokol | H04L 12/22 |
| | | | 726/23 |

(Continued)

OTHER PUBLICATIONS

Kamra, Ashish, et. al., Detecting Anomalous Access Patterns in Relational Databases, The VLDB Journal—The International Journal on Very Large Data Bases archive, vol. 17 Issue 5, Aug. 2008, pp. 1063-1077 Springer-Verlag New York, Inc. Secaucus, NJ, USA, http://download.springer.com/static/pdf/803/art%253A10.1007%252Fs00778-007-0051-4.pdf?auth66=1355176954_619a245f89d7eeb2c264787d15b4e204&ext=.pdf.

(Continued)

*Primary Examiner* — Maung T Lwin
(74) *Attorney, Agent, or Firm* — Anthony V. S. England; Reza Sarbakhsh

(57) ABSTRACT

Data traffic is monitored on a network with data access elements thereof collected and compared to security rules. An audit data collection is sent to a repository responsive to data access elements matching a condition of the security rules, where security rules having the condition designate the audit data collection and repository. A tag to data traffic is applied responsive to the matching condition. Comparing of collected data access elements to the corresponding security rules having the matching condition is discontinued responsive to applying the tag. The tag indicates a repository and the data traffic includes a connection and session. An audit data collection is sent to the repository indicated by the tag for a data access responsive to the tag in the tagged data traffic. The method continues sending audit data for future
(Continued)

data accesses in the tagged data traffic without comparing to the corresponding security rules again.

15 Claims, 6 Drawing Sheets

Related U.S. Application Data continuation of application No. 14/805,311, filed on Jul. 21, 2015, now Pat. No. 9,973,536, which is a continuation of application No. 13/937,196, filed on Jul. 8, 2013, now Pat. No. 9,106,682, which is a continuation of application No. 13/708,984, filed on Dec. 8, 2012, now Pat. No. 9,124,619.

(51) Int. Cl.
H04L 12/26 (2006.01)
H04L 12/24 (2006.01)

(52) U.S. Cl.
CPC ...... *H04L 63/1408* (2013.01); *H04L 63/1425* (2013.01); *H04L 41/0893* (2013.01)

(56) References Cited

U.S. PATENT DOCUMENTS

| | | | |
|---|---|---|---|
| 6,466,983 B1 | 10/2002 | Strazza | |
| 7,136,807 B2 | 11/2006 | Mueller | |
| 7,272,646 B2 | 9/2007 | Cooper | |
| 7,386,525 B2 | 6/2008 | Nurmela | |
| 7,548,985 B2* | 6/2009 | Guigui | H04L 41/0893 709/231 |
| 7,555,482 B2 | 6/2009 | Korkus | |
| 7,673,147 B2 | 3/2010 | Moghe | |
| 7,734,595 B2* | 6/2010 | Margolus | G06F 17/30368 707/609 |
| 7,814,075 B2 | 10/2010 | Sack | |
| 7,836,490 B2 | 11/2010 | Smith | |
| 7,890,626 B1 | 2/2011 | Gadir | |
| 8,578,500 B2 | 11/2013 | Long | |
| 8,832,829 B2 | 9/2014 | Manni et al. | |
| 8,874,711 B1 | 10/2014 | Zhang | |
| 9,106,682 B2 | 8/2015 | Foley | |
| 9,124,619 B2 | 9/2015 | Foley | |
| 9,973,536 B2 | 5/2018 | Foley | |
| 2002/0091942 A1* | 7/2002 | Cooper | H04L 41/0609 726/1 |
| 2002/0093527 A1 | 7/2002 | Sherlock | |
| 2002/0112178 A1 | 8/2002 | Scherr | |
| 2003/0051001 A1 | 3/2003 | Calvo | |
| 2003/0067874 A1 | 4/2003 | See | |
| 2003/0137538 A1 | 7/2003 | Hesmer | |
| 2004/0111639 A1 | 6/2004 | Schwartz | |
| 2004/0111643 A1 | 6/2004 | Farmer | |
| 2004/0128537 A1 | 7/2004 | Zurko | |
| 2004/0193912 A1 | 9/2004 | Li | |
| 2005/0071642 A1 | 3/2005 | Moghe | |
| 2005/0097149 A1 | 5/2005 | Vaitzblit | |
| 2005/0203881 A1 | 9/2005 | Sakamoto | |
| 2005/0203921 A1 | 9/2005 | Newman | |
| 2006/0293932 A1 | 2/2006 | Cash | |
| 2007/0039049 A1 | 2/2007 | Kupferman | |
| 2007/0094265 A1 | 4/2007 | Korku | |
| 2007/0226695 A1 | 9/2007 | Krishnaprasad | |
| 2008/0046964 A1 | 2/2008 | Muralidharan | |
| 2008/0109620 A1 | 5/2008 | Nabekura | |
| 2008/0155067 A1 | 6/2008 | Rivera | |
| 2008/0307493 A1 | 12/2008 | Mohge | |
| 2009/0193096 A1 | 7/2009 | Boyer | |
| 2012/0023556 A1* | 1/2012 | Schultz | G06F 21/41 726/4 |
| 2012/0089860 A1 | 4/2012 | Zaifman | |
| 2012/0102543 A1 | 4/2012 | Kohli | |
| 2012/0317652 A1* | 12/2012 | Kiley | H04W 4/02 726/27 |
| 2014/0068763 A1 | 3/2014 | Ward et al. | |
| 2015/0326616 A1 | 11/2015 | Foley | |

OTHER PUBLICATIONS

McAfee Real-Time Database Monitoring, Auditing, and Intrusion Prevention, white paper, http://www.mcafee.com/hk/resources/white-papers/wp-real-time-database-monitoring.pdf, downloaded Jan. 21, 2012.

* cited by examiner

DIRECTING AUDITED DATA TRAFFIC TO SPECIFIC REPOSITORIES

BACKGROUND

One way to address computer data security is to prevent or mitigate intrusions, that is, unauthorized data accesses. To mitigate intrusions it is helpful, of course, to detect them. One tool for detecting intrusions is to monitor user activities concerning data that is to be protected. Traditionally, real-time monitoring software systems may capture user activities rather indiscriminately and send all the captured information as an audit report to one or more repositories. For example, all the captured information is sent to a centralized repository and all the captured information is also sent to a back-up repository.

SUMMARY

A computer-implemented method for auditing data traffic includes monitoring data traffic on a network and collecting data access elements thereof. Data access elements are compared to security rules. An audit data collection is sent to a repository in response to one or more data access elements of a data access matching a condition of one of the security rules. The one of the security rules have the condition designates the audit data collection and the repository. A tag to data traffic of the data access is applied in response to the matching condition. The comparing of collected data access elements to the corresponding one of the security rules having the matching condition is discontinued responsive to applying the tag. The tag indicates a repository and the data traffic includes at least one of a connection and session. An audit data collection to the repository indicated by the tag for a data access is sent in response to the tag in the tagged data traffic. The computer-implemented method continues sending audit data for future data accesses that are in the tagged data traffic without the comparing to the corresponding one of the security rules again.

System and computer program products relating to the above-summarized method are also described and claimed herein.

BRIEF DESCRIPTION OF THE DRAWINGS

Novel features believed characteristic of the invention are set forth in the appended claims. The invention itself, however, as well as a preferred mode of use, further objectives and advantages thereof, will best be understood by reference to the following detailed description of one or more illustrative embodiments when read in conjunction with the accompanying drawings, wherein:

DETAILED DESCRIPTION

Descriptions of various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Terminology used herein was chosen to best explain the principles of the embodiments, the practical application or technical improvement over technologies found in the marketplace, or to enable others of ordinary skill in the art to understand the embodiments disclosed herein.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
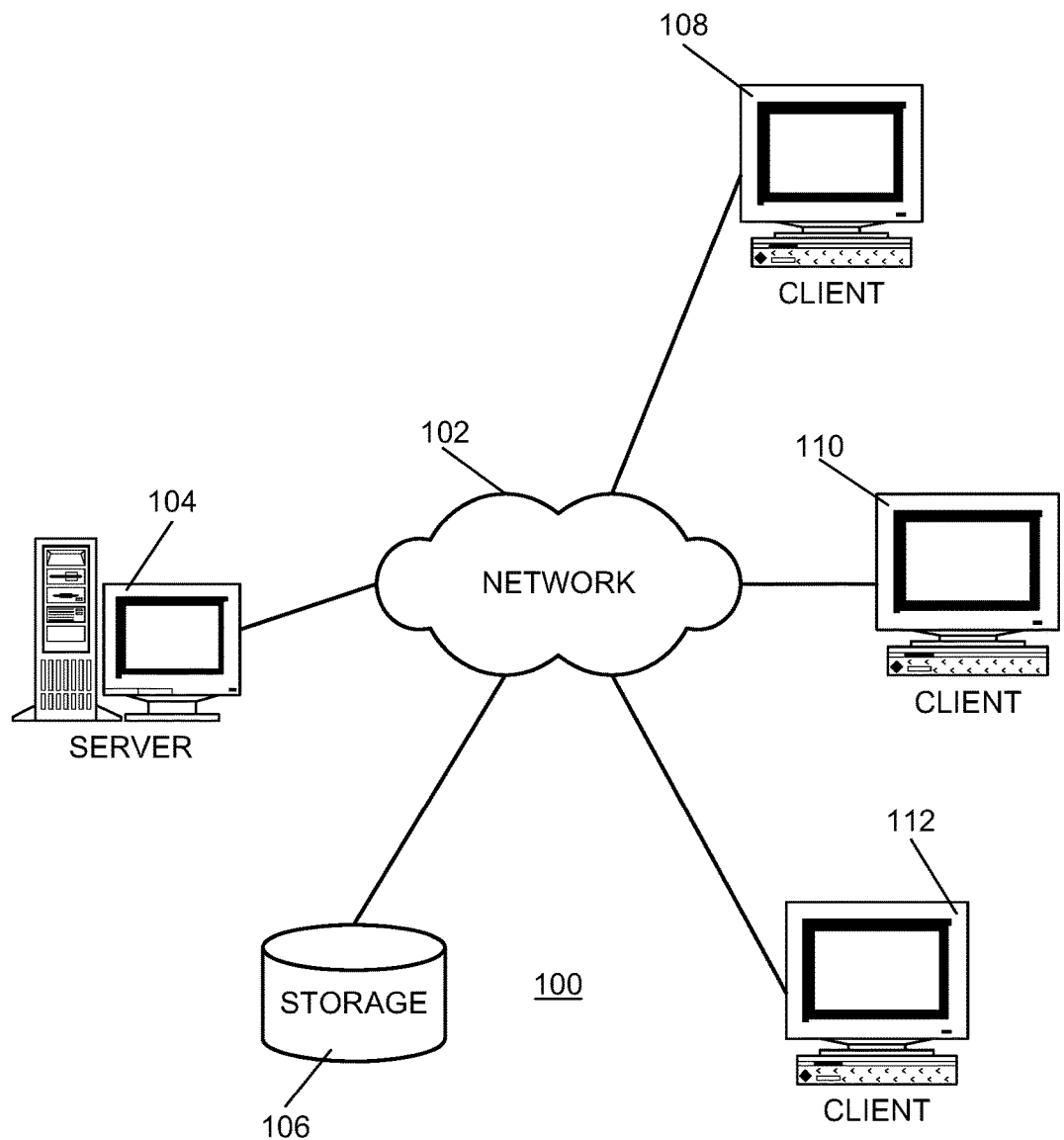
FIG. 1 depicts a pictorial representation of a network of data processing systems in which embodiments of the present invention may be implemented.

Referring now to FIG. 1, a pictorial representation of a network of data processing systems (also referred to as "computer systems") is depicted in which embodiments of the present invention may be implemented. Network data processing system 100 is a network of computer systems in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, one of the computer systems, server 104, is connected to network 102 along with storage unit 106. In addition, other computer systems, clients 108, 110, and 112, are depicted and are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
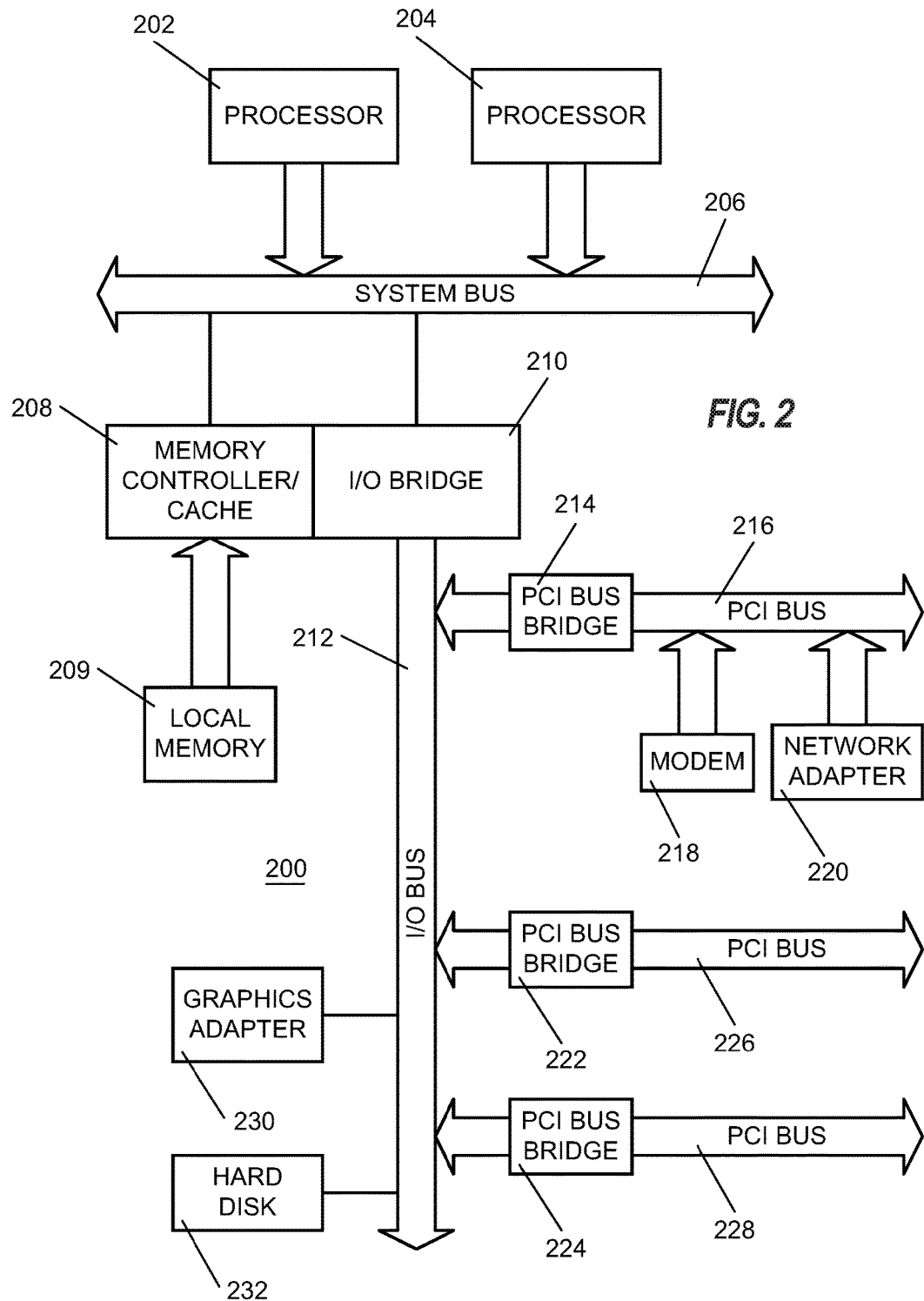
FIG. 2 is a block diagram of a data processing system that may be implemented as a server in which embodiments of the present invention may be implemented.

Referring to FIG. 2, a block diagram of a data processing system that may be implemented as a server, such as server 104 in FIG. 1, is depicted in accordance with embodiments of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
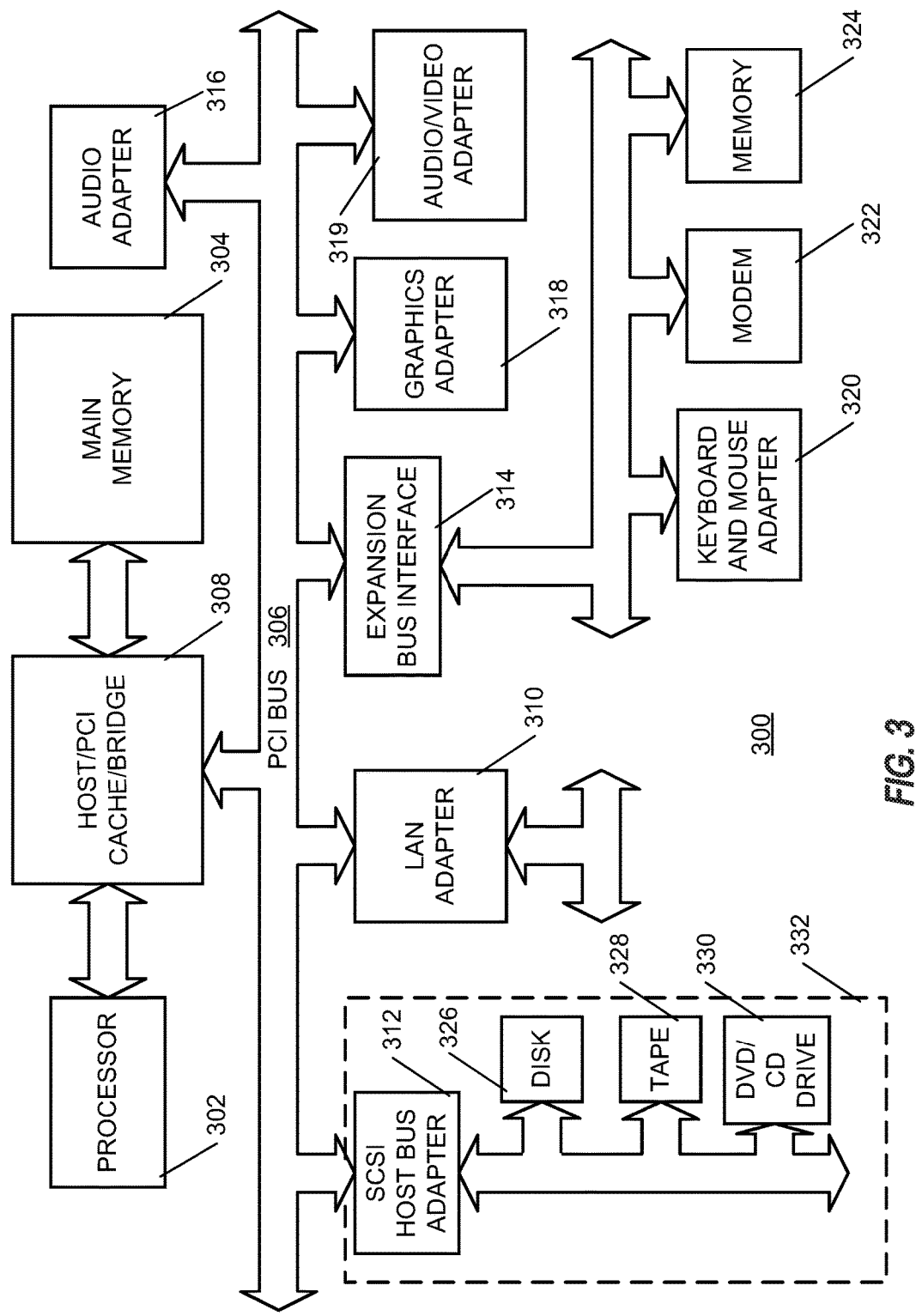
FIG. 3 is a block diagram illustrating a data processing system in which embodiments of the present invention may be implemented.

With reference now to FIG. 3, a block diagram illustrating a data processing system is depicted in which embodiments of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as a Windows operating system, which is available from Microsoft Corporation. ("Windows" is a trademark of Microsoft Corporation.) An object-oriented programming system such as Java may run in conjunction with the operating system and provide calls to the operating system from Java programs or programs executing on data processing system 300. ("Java" is a trademark of Sun Microsystems, Inc.) Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand-held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Figure 4:
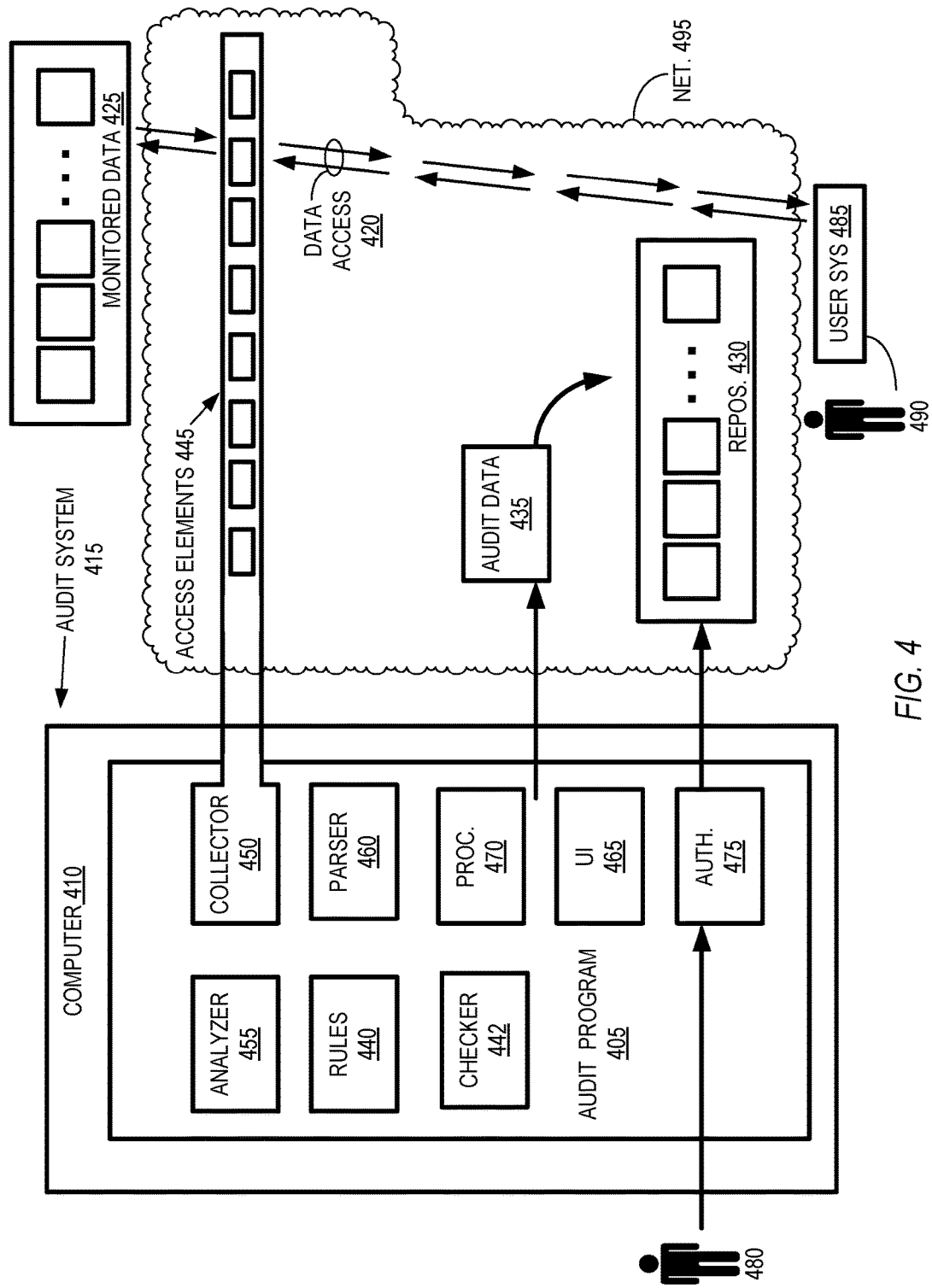
FIG. 4 is an exemplary diagram that provides an overview of aspects of an audit data system and its operation, according to one or more embodiments of the present invention.

Referring now to FIG. 4, aspects of an audit data system 415 and its operation are illustrated, according to embodiments of the present invention. An audit program 405 running on a computer system 410 provides audit data system 415, which monitors accesses 420 to data 425, such as by listening on network 495 or by other non-invasive techniques, in order to collect and store audit information. Other such techniques include i) linking agent code with compiled native application code at runtime and ii) intercepting device driver or kernel system calls used by an application at runtime. (In one or more embodiments of the present invention, audit program 405 may be implemented, at least in part, by features of IBM Corporation's Guardium® program. "Guardium" is a registered trademark of the IBM Corporation.) The monitoring may be throughout one or more entire organizations and may amass information for all data access traffic 420 taking place therein or may be more selective. In certain embodiments, the monitoring by audit program 405 has minimal impact on database server resources, since it is independent, i.e., outside, of database programs and does not require database configuration changes. In embodiments, audit program 405 may be included in a database program.

Via the monitoring, audit program 405 detects user activities relating to monitored data 425 accesses 420 and may block access and send alerts in real time. Audit program 405 may send secure audit trail information (also referred to herein as an "audit data collection 435") for the user activities, wherein audit program 405 may select different repositories 430 to which it sends the audit data collection 435 for different user activities. (Herein, the term "repository" may refer to one or more database tables or may refer to any given persistent data storage software for the audit data, like a file system, a database, or other.) The selection may depend upon predetermined security policy rules 440 and access activities for data 425, such as rules 440 set by an administrator (also referred to herein as a "auditor") of a caretaker organization for data 425.

In doing the above, there are at least two elements of filtering that audit program 405 performs: i) selecting which traffic to capture and tag as audit data collections 435 and ii) selecting where to send each audit data collection 435.

In monitoring and capturing audit trail information 435 for accesses 420 to data 425 within an enterprise, according to an embodiment of the present invention, audit program 405 identifies elements 445 of specific data 425 access activities 420. Audit program 405 may apply a security policy rule 440 that combines any of these elements 445 in order to categorize a data 425 access 420. According to embodiments of the present invention, rules 440 may delineate characteristics of one or more access, i.e., "access elements" 445. The following list sets out access elements which may be delineated in rules 440 and, in some instances, also describes actions caused when such access elements 445 satisfy a rule:

server IP address(es), e.g., any server, all servers selected by IP address and mask, a group of servers, or all servers selected by IP address and mask AND a group of servers (Example: 192.168.1.2/255.255.255.0)

client IP address(es): location of entity used for data access, e.g., any client, all clients selected by IP address and mask, a group of clients, or all clients selected by IP address and mask AND a group of clients (Example: a client IP address that does not belong to an Authorized Clients IP group)

client MAC: hardware used for data access, e.g., single client MAC address OR a dot (.) (Entering a dot in the Client MAC box indicates that a separate count should be maintained on each client MAC address OR Leave the Client MAC box empty to ignore client MAC addresses. (Example: 00:13:72:50:CF:40, nn:nn:nn:nn:nn:nn, where n is a hexadecimal digit (0-F))

network protocol(s): network protocol used to access data (Example: TCP)

database type: type of database accessed (Example: DB2, ORACLE)

service name: name of the service providing the data database name: name of database accessed database user: user accessing a database (Example: Functional users group being used to access the data)

client IP/src app/DB user/server IP/svc name: a "tuple" that allows any of these data access characteristics to be combined together to form a single group member.

source application: application used for data access (Example: Administrative Programs group)

application user name: user name for user of application generating SQL statements operating system user: operating system of user (Example: AIX)

field: database related field, e.g., field name in a table, parameter of a stored procedure (Example: the "a" in "select a from b" command for accessing data)

object: database object, e.g., table, store procedure (Example: the "b" in "select a from b" command for accessing data)

command: verb in an SQL statement for accessing data (Example: the "select" in "select a from b")

object/command group: member of selected database object and verb group, i.e., a tuple indicting multiple attributes in single group member object/field group: member of selected database object and database field group, i.e., a tuple indicting multiple attributes in single group member text patterns: text strings to match in data traffic, which may be specified by one or more regular expressions SQL pattern: portions of database query output to match, which may be specified by regular expressions (Example: mask the credit card numbers)

xml pattern: text strings to match in data traffic, which may be specified by one or more regular expressions application event exists: Yes or No (An application event is predefined by app event type, app event user name, app event values, etc. Note: If the application user cannot be identified from the traffic, audit program 405 uses an application events API to identify users and application user translation.)

app event type: application event type app event user name: application event user name app event values: application event, which may be text, numeric, or date values sensitive output data pattern: portions of database query output which may be specified by one or more regular expressions (Example: ([0-9]{3}-[0-9]{2})-[0-9]{4}))

user id chain: any user in a chain of user ids in the operation system being used to access data time period: a single time period of accesses (Example: 7×24. Example: 6 a.m.-12 a.m., i.e., a time period during which a user can access data)

minimum count: minimum number of times a rule must be matched before the rule's action is triggered (Example, trigger rule action after count of login failures exceeds 100 within one minute)

reset interval: number of minutes after which a "condition met" counter will be reset to zero (In the above example in "Minimum Count," the reset Interval value is one minute.)

quarantine for: time period during which same user is prevented from logging into the same server records affected threshold: threshold value for records matched in data accesses (Example: Let 1000 instances take place before taking action. "Records affected threshold" is based on rule and session and counts an accumulated number of returned rows from all queries that meet a stated condition. Once all accumulated records affected reach the threshold, the rule will trigger and the records affected will be reported, if the rule specifies full details logging.)

error code: error code from database when data access is denied (Combined with "minimum count" access element, may identify database accesses that indicate of lack of training or unauthorized attempts)

exception type: type of exception associated with data access, e.g. login_failed, session_error, SQL_error server IP address: location of data accessed (Other forms of addressing such as IPv6 are included in embodiments of the present invention, although IPv4 addressing has been shown in the above list.)

Specifically, audit program 405 has collector, analyzer and parser modules. Collector module 450 collects each client request 420 and passes it to analyzer module 455, which is configured with various protocol structures in use for data transmission by numerous applications and databases, so analyzer module 455 can extract commands contained in the data. Analyzer module 455 extracts each request 420 and passes it to parser module 460, which then parses each request 420 into its constituent parts according to a SQL construct based schema (e.g. VERB, OBJECT, FIELD, etc.). Once module 460 parses a request 420, it passes the request's SQL construct based parts to a rule checking module 442, which checks the set of predefined rules 440 to see if any rules are triggered.

If checking module 442 determines a rule 440 is matched by a particular a data 425 access 420, module 442 may categorize and tag the data 425 access 420 as a suspicious access, capture predetermined ones of the above listed elements 445 for an audit data collection 435, and send collection 435 to storage in a repository 430, as well as taking other actions, such as blocking and alerting, as previously mentioned.

Regarding the security policies 440, according to embodiments of the invention, a security policy 440 data structure receives definitions, such as via a user interface 465 from an administrator, where the definitions delineate combinations of the above described elements 445. In general terms, elements 445 that may be combined to define security policy rules 440 include elements in the following categories, for example:

Data: identities of data entities, including databases, tables, fields, and other data entities that may be accessed; and characteristics of the data entities, including sensitivity classification of the data.

Users: user identities, e.g., computer systems and groups of computer systems; and characteristics of the users, such as job functions/roles, data sensitivity level for which data access is authorized, and data use characteristics.

Repositories: identities of data repositories for storing audit trail information and characteristics of the data repositories.

Associations: each data entity's association to respective users authorized to access the particular data entity, and, conversely, each user's association to respective data entities to which the user is authorized access; and default associations of each data repository to the respective users.

Actions: access events, counts, time intervals, etc. that may serve as conditions for a rule.

By using combinations of these elements 445, rules 440 delineate who (e.g., what client application running on what user's computer) can access 420 what data 425 and under what conditions. That is, rules 440 provide different access criteria applicable to different ones of individual computer systems or groups of computer systems that access 420 data 425.

In another aspect, a rule may define a message template indicating a message sent in automated alerts when certain rules are violated. Named Message templates are created and modified from a Global Profile/Admin Console.

A security policy rule 440 may be configured with "audit levels," i.e., to cause audit program 405 to respond with the following different actions when the rule 440 is satisfied:

Allow: When the rule is matched, do not log a policy violation. SQL Constructs are logged.

Audit Only: Use with Selective Audit Trail (SAT) only. Fill in Audit Pattern on Policy Definition menu. Log the construct that triggered the rule.

Log only: Log the policy violation only

Log masked details: Log the full SQL for this request, replacing values in a request with question marks, such as for privacy security reasons Log full details: Log the full SQL string and exact timestamp for this request.

Log full details with values: Log full SQL string, exact timestamp and parse and log the values in a separate table.

Log full details per session: Log full SQL string and exact timestamp for this request and for the remainder of the session.

Log full details with values per session: Log the full SQL string and exact timestamp for this request and for the remainder of the session.

Figure 5:
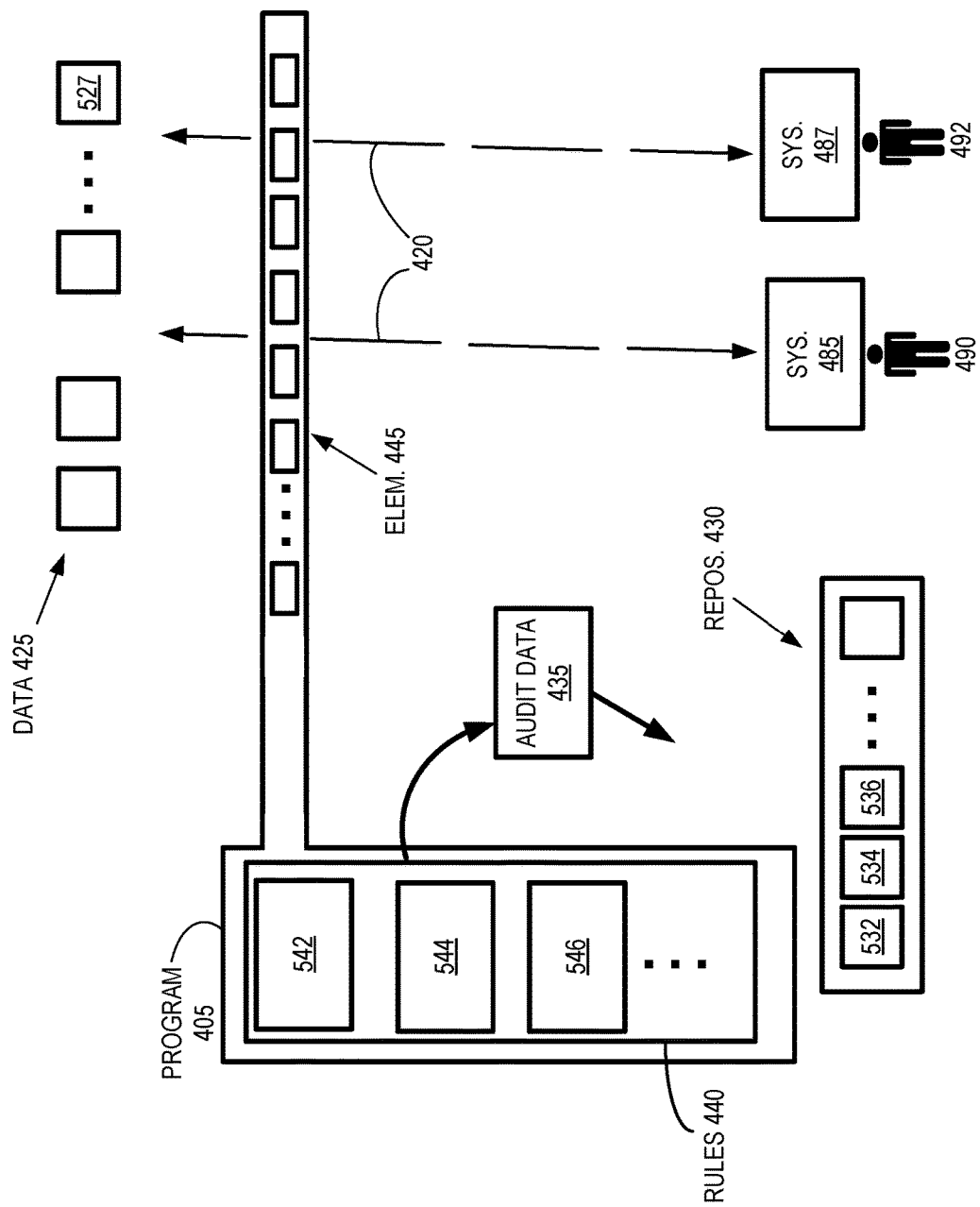
FIG. 5 is an exemplary diagram that provides a more detailed view of how certain embodiments of the invention filter data accesses and responsively delivers audit how certain embodiments of the invention direct incoming traffic by data 425 types, according to one or more embodiments of the present invention.

FIG. 5 shows a sequence that illustrates how certain embodiments of the invention filter data 425 accesses 420 and responsively deliver audit data 435 based on user names, client IP addresses, etc., which may include persistent tagging via rule creation, as mentioned above. In this example, two users 490 and 492 are accessing 420 data 425 on an enterprise data system. User 490 is a regular user who is accessing the normal data 425. Audit program 405 identifies user 492 as a suspicious user based on monitoring his/her access 420 history and matching one of the predetermined rules 440, such as rule 544 defining a condition according to which user 492 accesses 420 data 425 outside of normal working hours, for example.

Among rules 440, a default rule 542 designates a default repository 532 among the various repositories 430. Program 405 responsively captures from the access 420 audit data 435 that is defined by matching rule 544 and sends data 435 to repository 534, which may be on a different data server than is designated by rule 542. In addition, rule 544 is configured to cause program 405, responsive to access or accesses 420 matching rule 544, to automatically capture predetermined elements 445 of the access 420, such as the user name, database user name, IP address, or other identifying characteristics of individual 492, and to automatically include them in a new, second rule 440 that program 405 responsively creates automatically. Consequently, audit program 405 is now configured with an additional, new rule 546 to filter out this potential hacker 492, so that even if the original access 420 conditions (i.e., data access elements) that matched rule 544 are not met again, rule 546 will still cause program 405 to send audit data 435 for future accesses 420 from user 492 to non-default repository 534.

In applying rules 440 to monitored user data access 420 activity, audit program 405 determines which computer system, e.g., 485 and 487, is the user in each activity, captures each user's session of such activity 420 as an audit data collection 435, such as a data record, tags the information and sends it to tables in a default one of repositories 430, where each user may be assigned a default one of data repositories 430.

Also, a rule 440 may indicate that due to the user, activity or data entity, the audit information 435 should be directed to a different or additional repository 430. The set of specific data repositories 430 is encapsulated as a RepositoryIdentifier for the user's session. All subsequent data accesses in the same session are tagged with the same RepositoryIdentifier and logged (i.e., stored) in the same set of data repositories 430. 542

A logging controller of audit program 405 is configured to know what data should be sent to multiple data repositories, i.e., data that is useful for intrusion detection and audit. In certain embodiments of the present invention, audit program 405 logs non session-based data only in the default repository 430, which may be local to audit data system 415.

For instance, an administrator may configure audit program 405 with a rule 440 according to which a certain data server is designated to store a repository 430 for all traffic originating from a given IP address that is accessing certain database tables 425 in an enterprise database. For this rule 440 the administrator configures audit program 405 to capture an audit data collection 435 that includes the name of the database user, the names of the tables being accessed, the IP address that is accessing the tables and the times of accesses.

Then, when audit program 405 audits traffic, any connection to database 425 that originates from the given IP address is tagged by audit program 405 with a repository identifier specifying the particular repository 430. Additionally, when any further traffic from that IP address arrives, audit program 405 sends to the particular repository 430 the audit data collection 435, which according to the configuration in this exemplary instance is the user name, IP address, the time of access and the identities of the tables being accessed. Data collection 435 on server DSDS thus provides a specific database audit trail 435 for traffic originating from that IP address containing highly specific data for generating an audit report.

Examples of security policy rules 440, according to embodiments of the present invention, include the following:

A security policy may include a rule that selectively directs audit information to different data repositories according to user access level. That is, if a user is a client or group granted access to data having a high-level sensitivity characteristic, then the policy delineates that audit information for that user shall be directed to a data repository that is subject to more audit analysis than is a data repository for audit information from a client or group having a lower level of data access.

A security policy may include a rule that that selectively directs audit information to different data repositories according to data sensitivity level. That is, if a user actually accesses data having a high-level sensitivity characteristic, then audit information for that data access shall be directed to a data repository that is subject to more audit analysis than is a data repository for audit information of data having lower sensitivity.

A security policy may include a rule that audit information shall be directed to different data repositories according to different job function of users or according to job function and data characteristic associations (or lack of association). That is, for example, a rule may delineate that an attempted access to data that has no association to a user's job function indicates suspicious activity.

A security policy may include a rule that selectively directs audit information to different data repositories according to data identity, i.e., which databases, tables, fields, or other data entities are accessed.

A security policy may include a rule that directs audit information to different data repositories according to nature of data usage. That is, for example, if an amount of data of a particular type that is accessed in a given time interval by a particular, predefined type of user exceeds a predefined threshold, then the rule may delineate that the audit information for those accesses shall be directed to a particular data repository that is subject to more audit analysis than is a data repository for audit information of data for which the threshold, data type or user type are not met.

In embodiments of the invention, user interface 465 is coupled with a process 470 that automatically configures policy rules 440, responsive to input by the administrator in an initialization mode, with a structure based on that of SQL queries, such that each policy rule 440 can be easily parsed by parsing module 460 into corresponding SQL components (e.g., commands, objects, fields, where-clause, etc.). For example, if an organization wants to audit any access to a highly sensitive data table (such as, for example, CUSTOMER_PROFILE, which contains critical data about customers), an auditor may configure a rule 440 having the specific table name, which is a SQL object, and delineating actions to take for an access 420 to this table.

Thus, monitoring by audit program 405 may detect a user request to this CUSTOMER_PROFILE table, by collecting the request, parsing it, comparing the component parts of the request to rules 440, and finding a match to a rule 440 delineating the table. For example, such a request may be a request to select information from this table ("select * from CUSTOMER_PROFILE"), update some records in this table ("update CUSTOMER_PROFILE set a=b"), delete some records from this table ("delete CUSTOMER_PROFILE where credit_card_number=audit program 405X"), etc.

Responsive to collector 450 capturing an "update CUSTOMER_PROFILE set a=b" request, for example, parser 460 parses the request into the "update" command and "CUSTOMER_PROFILE" object and module 442 compares this to the predefined rules 440 and finds a match with a rule 440 delineating i) a SQL command that includes "update" and an object that includes "CUSTOMER_PROFILE." An action delineated in the rule 440 for access 420 to this table specifies what audit data to capture and where to send it, e.g., a special repository 430. Consequently, responsive to detecting a user request to this CUSTOMER_PROFILE table, audit program 405 captures and sends the audit data 435 to the special repository 430. On the other hand, responsive to detecting a user request 420 that does not match a policy rule 440 for a highly sensitive data 425 access 420, audit program 405 may be configured by a default rule 440 to capture and send default audit data to a default repository 430.

A security policy may include a rule 440 that is persistent, wherein after a user, data entity, connection, etc. is deemed suspicious by rule 440, subsequent data 425 access 420 for that identified user, data entity, connection, etc. is persistently diverted to a particular data repository 430. That is, depending on the configuration that audit program 405 received from the administrator, audit program 405 may collect and tag more than one session as an audit data collection 435 (i.e., more than one session of one user or one or more sessions of more than one user) and send collection 435 to one or more predetermined data repositories. This may also include tagging a connection by automatically creating a new rule 440 when an initial rule 440 has been met by an access, such that the new rule causes future traffic 420 from the same connection to likewise be tagged as suspicious and be subject to specific actions as well.

Generally, tags used may indicate one or more data repositories 430 to which audit program 405 will send audit data captured for a user, connection, data entity etc. When audit program 405 monitors audited data 425 accesses 420, it compares the traffic 420 to all the policy rules 440. If a rule 440 applies, audit program 405 tags that data access 420 and the connection associated with the data access 420 to indicate a repository identifier for whatever repository 430 may apply. These repository identifiers allow audit program 405 to use any security policy rule 440 to persistently send all traffic 420 for a given connection, user data entity, etc. to specific data repositories 430.

According to embodiments of the present invention, when an audit system is installed there are initially no rules. An administrator 480 adds rules 440 as needed. So, for instance, administrator 480 may create a rule 440 to search each and every command (access element 445) for a piece of data, like a credit card number, in which case system 415 checks all data traffic 420 (as it is collected) for commands and checks all commands found for the credit card number to see if there is traffic 420 that matches the rule 440. Administrator 480 would configure system 415 in this manner with awareness, of course, that system 415 must have adequate resources to implement that rule 440 with reasonable performance, which the administrator 480 is able to verify. There would be no such performance concern if an auditor 480 searched audit data 435 for the credit card number after the data 435 has been stored in a repository 430, rather than creating a rule to check the data as it is being collected.

On the other hand, the administrator 480 may also create a rule 440 configured such that once a data access 420 is identified as matching the rule's conditions, the rule 440 directs system 415 to identify the session and save that identification in association with a tag indicating one or more repositories 430. The rule 440 also directs system 415 to store audit data 435 at that tag-indicated one or more repositories 430 for any subsequent data traffic 420 identified by that session identification without again checking the data traffic 420 to see whether it matches all the rule's conditions. This addresses performance concerns by reducing computer system 410 resources required for repeated rule 440 checking while still capturing audit data 435 that is indicated by an initial rule 440 match.

FIG. 5 also illustrates how certain embodiments of the invention direct incoming traffic 420 by data 425 types. In the example, user 492 is accessing 420 multiple data sources 425 in an enterprise. The security monitoring by audit program 405 is configured with a rule 548 delineating a particular, critical data source 527 among data sources 425, so that the rule 548 matches the critical data source 527. Matching rule 548 designates another repository 536, i.e., other than default repository 532 for audit data 435, which may be on a different data server than that of the repository 532. Audit program 405 identifies an access 420 by user 490 to the critical data source 527 defined in the matching rule 548. Program 405 responsively captures audit data 435 from the access 420, where the audit data 435 to capture is defined by the matching rule 548, and program 405 sends the data 435 to the repository 536 in addition to default repository 532. Auditors may run analysis on the vast amounts of regular, unfiltered audit data 435 in the default repository 532, but the filtered data repositories 534 and 536 contain only audit data 435 for specially selected accesses 420.

According to embodiments of the present invention, access to audit data 435 is controlled via an authentication process 475, which is configured to limit the accesses to predetermined audit personnel 480 who each have a predetermined security clearance level, wherein some of the personnel 480 have a higher clearance level that allows access to more sensitive audit data 435 than other personnel 480. An administrator configures authentication process 475 to require the higher level of security clearance for personnel 480 accesses to the selected audit data 435 sent by audit program 405 to specially designated repositories 430.

Audit data repositories 430 can be diverse, ranging from a flat text file to various database servers. According to embodiments of the invention, monitored data 425 are stored as audit data 435 in databases having schemas tailored to the monitored data 425 itself, rather than capturing audit data 435 in a flat log file. To enable this, audit program 405 has Application Program Interfaces (API's) for delivering audit data 435 to each possible type of repository 430, in embodiments of the invention. Each API dictates what class of audit data 435 can be sent to each repository 430. That is, different aspects of monitored data are logged as audit data in different database tables having schema matching the aspects of the monitored data. It is useful to capture and store different elements of monitored data in respective tables because this makes for easier reporting and access, including searching and browsing. It allows detecting access intrusions and auditing based on elements of query data.

In one example, for monitored traffic audit program 405 captures and API stores client/server connection information for an access 420 as audit data 435 in a GDM_ACCESS table in default repository 430. If connection information is of interest to detect suspicious connections, a rule is configured to also direct audit data 435 in GDM_ACCESS to another specific data repository 430.

In another example, consider a monitored SQL request 420:

select * from employee_table where employee_id=4940
        and hire_date='10/29/01'

For this request 420, one or more rules 440 may be configured to capture any or all of the SQL components of the monitored request 440 for storing as audit data 435, such as:

command: "select,"
    object: "employee_table,"
    fields: ("employee_id", "hire_date"), where-clauses: (employee_id=? and hire_date=?),
specific field values: (4940, 10/29/01), or
full SQL sentence, etc.

Further, the one or more rules 440 may be configured to store the audit data 435 based on internal SQL components of the request 420. That is, for example, audit data system 415 includes a database repository 430 having the following default tables that are relevant to the above example request 420: GDM_COMMAND, GDM_OBJECT, GDM_FIELD, GDM_CONSTRUCT_TEXT, GDM_CONSTRUCT_VALUES and GDM_SENTENCE tables. The one or more rules 440 may be configured to direct audit program 405 to store each respective one of these components in a repository 430 table that corresponds to the respective component, so that, for example, "employee_table" may be stored in the GDM_OBJECT table (since it is the object of the "select" command), "employee_id" and "hire_date" may be stored in the GDM_FIELD table (since they are fields specified in the command of the table that is the object of the command), etc. In various embodiments, the "select" command of this example may be stored in a default table GDM_SENTENCE, a default table GDM_COMMAND, or in both, depending on configuration.

Not only are the table names different, but the structure of the tables is different, so that the GDM_OBJECT table stores characteristics of objects whereas the GDM_FIELD table stores characteristics of fields, for example. Fields have an associated clause (e.g. where-clause, group-by clause, order-by clause, etc.), while objects have associated types.

The following more generally describes default tables in repository 430, which include:
  GDM_ACCESS: logs the information on from where to where the access occurred. It contains client/server information.
  GDM_SESSION: logs the database SQL Session information originating from the same access. It contains the session start and end time, the session event info, etc.
  GDM_CONSTRUCT: logs the original/full SQL construct information. e.g. "Select A from B"
  GDM_SENTENCE: logs the verb information in the SQL construct. e.g. verb "Select" from the construct "Select A from B"
  GDM_OBJECT: log the table names in the SQL construct. e.g. table "B: from the construct "Select A from B"
  GDM_FIELD: log the column names in the SQL construct. e.g. field "A" from the construct "Select A from B"
  GDM_JOIN: logs the join information in the SQL constructs, it contains the where-clause text and the table object for the where-clause, e.g. "Select c from myTable where c>1". The "myTable" and "c>1" are logged as "join_sql" and "where_sql" in the GDM_JOIN table.
  GDM_CONSTRUCT_INSTANCE: Contains the count of executions for a specific SQL construct (Select, drop, etc.) during a specific period of time for a specific session
  GDM_CONSTRUCT_TEXT: Table used to log SQL Structure when logging full details
  GDM_CONSTRUCT_VALUES: Table used to hold values for Log Full Details with values. The values are linked to a field in the construct.
  GDM_ERROR: Logs known SQL errors, with error type and description.
  GDM_EXCEPTION: Logs exceptional traffic, such as: unknown session/login, login failed, TCP error, failed to parse SQL message, and any other traffic not fully understood by audit program 405.

Further, audit program 405 may simultaneously send real-time alerts to security authorities in the organization or may immediately block access from a user or connection deemed highly suspicious.

In some implementations, automatically detecting and diverting highly suspicious activities may be immediately and directly accomplished by audit program 405's analysis of data 425 access 420 activities and application of the above mentioned, predetermined security policies 440 thereto.

In some implementations, automatically detecting highly suspicious activities may be accomplished by audit program 405 first sending more suspicious audit trail information 435 for data 425 selectively to a first database 430 and less suspicious audit trail information to a second database 430. The determination of more versus less suspicious activity may be made by audit program 405's analysis of access 420 activities and application of predetermined security policies 440, such as described herein above, for example. Then, since the audit trail information 435 received by first database is known to be more suspicious, additional resources may be applied, wherein another application or another process of audit program 405 may further analyze that audit trail information 435. This additional analysis may detect highly suspicious activities based on the audit information 435, in which case the application or additional process of audit program 405 may responsively send an alert or send audit data to still another repository 430 that receives higher priority auditor attention.

Figure 6:
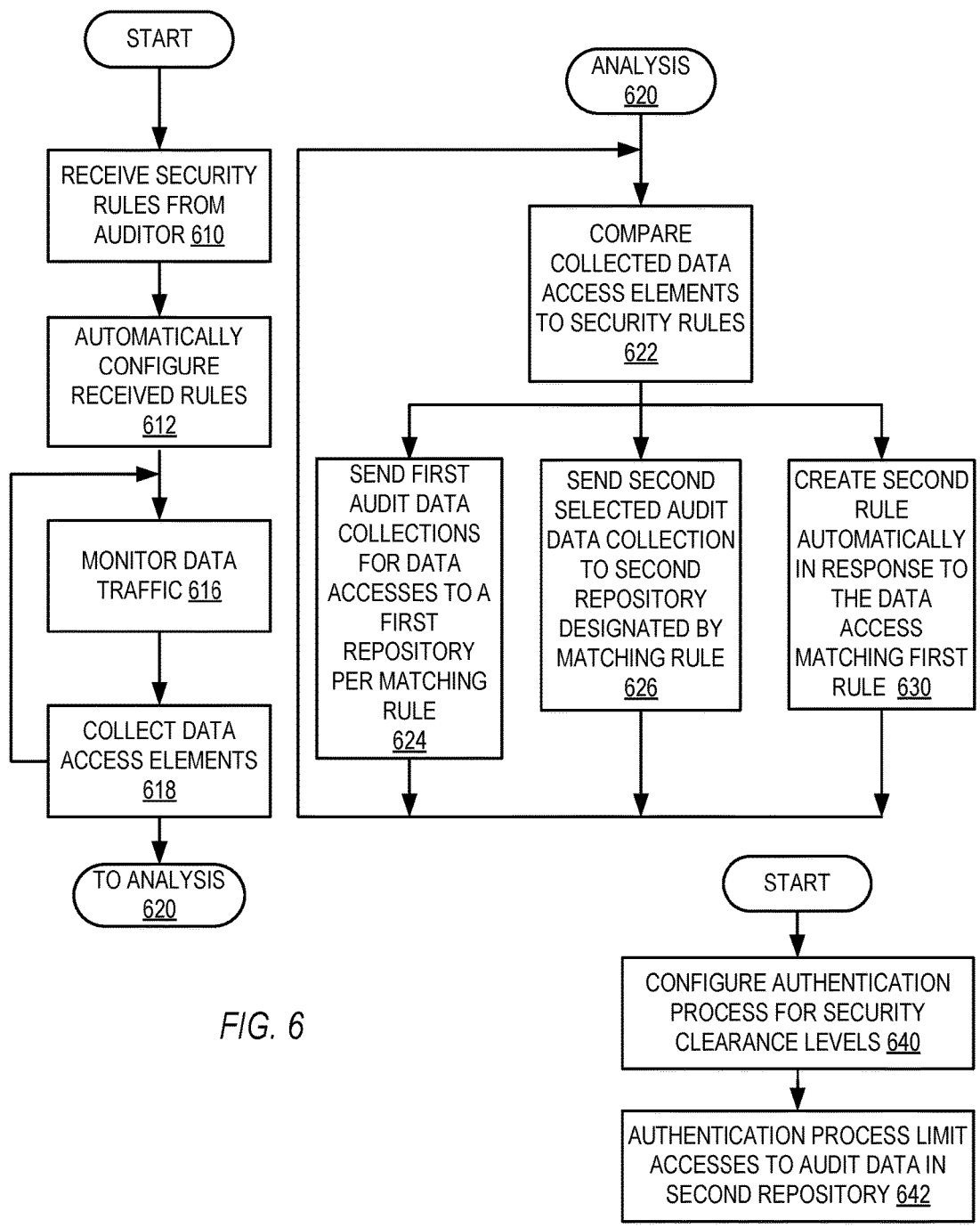
FIG. 6 is a flow chart illustrating exemplary process aspects, according to one or more embodiments of the present invention.

Referring now to FIG. 6, aspects of processes are illustrated according to embodiments of the present invention. In an initialization mode, a computer program receives 610 security rules auditor inputs via a user interface, where the rules are for applying to monitored data accesses, which have data access elements including data query components, as described herein above. The program automatically configures 612 the received rules to include structure based on data query structures, such that the rules have components corresponding to the components of data queries. In this manner, the rules provide sets of predefined data access elements for identifying predefined data accesses In another aspect, a computer implemented process monitors 616 data traffic on a network and captures 618 data access elements thereof. A process analyzes 620 the data, compares 622 data access elements thereof to the security rules and sends 624 first audit data collections for data accesses to a first repository, which may be a default repository in some embodiments of the present invention. In at least some instances, for one of the data accesses that matches one of the rules, the process sends 626 a second audit data collection defined by the matching rule to a second repository designated by the matching rule. (It should be appreciated that there may be additional repositories and that the matching rule or additional matching rules may cause sending audit data to different ones or combinations of ones of the repositories, depending on the configurations of the rules, which may even include sending audit data for one data access or session or connection to more than two repositories.)

For audit data sent 624 to the first repository, this may include sending respective ones of the data access elements of the data accesses to respective databases of the first repository. Likewise, for audit data sent 626 to the second repository, it may include sending respective ones of the data access elements of the data accesses to respective databases of the second repository. Further, in embodiments of the present invention, the data access elements for the data accesses include data query components, and either or both repositories include databases having schema according to data query components, so that the sending 624 and 626 may include sending respective ones of the data query components to respective databases having schema corresponding to the respective ones of the data query components.

In another aspect, a matching rule is a first rule in one instance and a computer implemented process creates 630 a second rule automatically in response to the data access matching the first rule, wherein the second rule is configured for sending predetermined elements of future data accesses that match the second rule to the second repository. In analyzing 620 captured data for later data accesses, even though all elements of the data access that matched the first rule are not present again, the computer-implemented process still sends 626 audit data collections for those accesses that match the second rule to the second repository.

Further, in another aspect, an authentication process is configured 640 to recognize security clearance levels, wherein some ones of audit personnel have a lower clearance level than other audit personnel. The authentication process automatically limits 642 accesses to audit data collections in the second repository, such that the audit data collections in the second repository are not accessible to audit personnel having the lower level of security clearance.

The above described policy rules and procedures tend to filter out suspicious activity from the very large amounts of normal and legitimate database accesses. This new arrangement for automatically detecting and diverting highly suspicious activities may permit much more timely intrusion detection than conventional arrangements wherein uncategorized database traffic audit information is manually filtered, which is a tedious and time-consuming job, at best. Indeed, considering the vast amounts of data transmitted to and from servers within any large organization today, known solutions of manually auditing traffic tend to be impractical.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for auditing data traffic, the computer-implemented process comprising:
   monitoring data traffic on a network and collecting data access elements thereof;
   comparing the collected data access elements to security rules;
   sending a first audit data collection to a first repository based on a first security rule of the security rules,
      wherein the first security rule:
         defines a first condition based on a first data access element of the collected data access elements,
         defines the first audit data collection,
         designates the first audit data collection as a default audit data collection for a first user, and
         designates the first repository as a default repository for the first user,
      wherein the first audit data collection includes a second data access element of the collected data access elements and
      wherein the sending occurs in response to one or more of the collected data access elements of a data access by the first user matching the first condition in the first security rule and the sending directs the first audit data collection to the first repository responsive to the designation of the first repository in the first security rule; and
   sending, for the data access by the first user, a second audit data collection to a second repository based on a second security rule of the security rules,
      wherein the second security rule:
         defines a second condition based on a third data access element of the collected data access elements,
         defines the second audit data collection and
         designates the second repository as a repository for the second audit data collection,
      wherein the second audit data collection includes a fourth data access element of the collected data access elements and
      wherein the sending the second audit data collection to the second repository occurs in response to one or more of the collected data access elements of the data access by the first user matching the second condition in the second security rule and the sending the second audit data collection directs the second audit data collection to the second repository responsive to the designation of the second repository in the second security rule,
      wherein the third data access element is different than the fourth data access element, and
      wherein the third data access element is a database table name and the fourth data access element is an IP address from which the database table is accessed.

2. The method of claim 1, wherein one or more of the collected data access elements for the first condition indicate a less suspicious data access than one or more of the collected data access elements for the second condition and wherein the first repository has a lower audit priority than the second repository, wherein in the sending of the first audit data collection to the first repository, the first audit data collection is for a less suspicious data access and is sent to a lower audit priority repository and in the sending of the second audit data collection to the second repository, the second audit data collection is for a more suspicious data access and is sent to a higher audit priority repository.

3. The method of claim 1, wherein one or more of the collected data access elements for the first condition define a first data identity and one or more of the collected data access elements for the second condition define a second data identity, wherein in the sending of the first audit data collection to the first repository, the first audit data collection is for a data access matching the first data identity and in the sending of the second audit data collection to the second repository, the second audit data collection is for a data access matching the second data identity.

4. The method of claim 3, wherein the first data identity is for data having a sensitivity level and the second data identity is for data having a higher data sensitivity level, wherein in the sending of the first audit data collection to the first repository, the first audit data collection is for a less sensitive data access and in the sending of the second audit data collection to the second repository, the second audit data collection is for a more sensitive data access.

5. The method of claim 1, wherein one or more of the collected data access elements for the first condition defines an amount of data accessed and one or more of the collected data access elements for the second condition defines a larger amount of data accessed, wherein in the sending of the first audit data collection to the first repository, the first audit data collection is for a smaller data access and in the sending of the second audit data collection to the second repository, the second audit data collection is for a larger data access.

6. A system comprising:
   at least one hardware computing processor; and
   a computer-readable storage media connected to the at least one hardware computing processor, wherein the computer-readable storage media has stored thereon a data traffic auditing program for controlling the at least one hardware computing processor, and wherein the at least one hardware computing processor is operative with the program to execute the program to:
      monitor data traffic on a network and collecting data access elements thereof;
      compare the collected data access elements to security rules;
      send a first audit data collection to a first repository based on a first security rule of the security rules,
         wherein the first security rule:
            defines a first condition based on a first data access element of the collected data access elements,
            defines the first audit data collection, designates the first audit data collection as a default audit data collection for a first user, and designates the first repository as a default repository for the first user, wherein the first audit data collection includes a second data access element of the collected data access elements and wherein the sending occurs in response to one or more of the collected data access elements of a data access by the first user matching the first condition in the first security rule and the sending directs the first audit data collection to the first repository responsive to the designation of the first repository in the first security rule; and send, for the data access by the first user, a second audit data collection to a second repository based on a second security rule of the security rules, wherein the second security rule:

defines a second condition based on a third data access element of the collected data access elements, defines the second audit data collection and designates the second repository as a repository for the second audit data collection, wherein the second audit data collection includes a fourth data access element of the collected data access elements and wherein the sending the second audit data collection to the second repository occurs in response to one or more of the collected data access elements of the data access by the first user matching the second condition in the second security rule and the sending the second audit data collection directs the second audit data collection to the second repository responsive to the designation of the second repository in the second security rule, wherein the third data access element is different than the fourth data access element, and wherein the third data access element is a database table name and the fourth data access element is an IP address from which the database table is accessed.

7. The system of claim 6, wherein one or more of the collected data access elements for the first condition indicate a less suspicious data access than one or more of the collected data access elements for the second condition and wherein the first repository has a lower audit priority than the second repository, wherein in the sending of the first audit data collection to the first repository, the first audit data collection is for a less suspicious data access and is sent to a lower audit priority repository and in the sending of the second audit data collection to the second repository, the second audit data collection is for a more suspicious data access and is sent to a higher audit priority repository.

8. The system of claim 6, wherein one or more of the collected data access elements for the first condition define a first data identity and one or more of the collected data access elements for the second condition define a second data identity, wherein in the sending of the first audit data collection to the first repository, the first audit data collection is for a data access matching the first data identity and in the sending of the second audit data collection to the second repository, the second audit data collection is for a data access matching the second data identity.

9. The system of claim 8, wherein the first data identity is for data having a sensitivity level and the second data identity is for data having a higher data sensitivity level, wherein in the sending of the first audit data collection to the first repository, the first audit data collection is for a less sensitive data access and in the sending of the second audit data collection to the second repository, the second audit data collection is for a more sensitive data access.

10. The system of claim 6, wherein of the collected data access element for the first condition defines an amount of data accessed and one or more of the collected data access elements for the second condition defines a larger amount of data accessed, wherein in the sending of the first audit data collection to the first repository, the first audit data collection is for a smaller data access and in the sending of the second audit data collection to the second repository, the second audit data collection is for a larger data access.

11. A non-transitory computer program product for auditing data traffic, the computer program product comprising:

a non-transitory computer-readable storage medium; and computer-readable program code embodied in the non-transitory computer-readable storage medium, wherein the computer-readable program code is configured to cause at least one computing processor to:

monitor data traffic on a network and collecting data access elements thereof;

compare the collected data access elements to security rules;

send a first audit data collection to a first repository based on a first security rule of the security rules, wherein the first security rule:

defines a first condition based on a first data access element of the collected data access elements, defines the first audit data collection, designates the first audit data collection as a default audit data collection for a first user, and designates the first repository as a default repository for the first user, wherein the first audit data collection includes a second data access element of the collected data access elements and wherein the sending occurs in response to one or more of the collected data access elements of a data access by the first user matching the first condition in the first security rule and the sending directs the first audit data collection to the first repository responsive to the designation of the first repository in the first security rule; and send, for the data access by the first user, a second audit data collection to a second repository based on a second security rule of the security rules, wherein the second security rule:

defines a second condition based on a third data access element of the collected data access elements, defines the second audit data collection and designates the second repository as a repository for the second audit data collection, wherein the second audit data collection includes a fourth data access element of the collected data access elements and wherein the sending the second audit data collection to the second repository occurs in response to one or more of the collected data access elements of the data access by the first user matching the second condition in the second security rule and the sending the second audit data collection directs the second audit data collection to the second repository responsive to the designation of the second repository in the second security rule, wherein the third data access element is different than the fourth data access element, and wherein the third data access element is a database table name and the fourth data access element is an IP address from which the database table is accessed.

12. The non-transitory computer program product of claim 11, wherein one or more of the collected data access elements for the first condition indicate a less suspicious data access than one or more of the collected data access elements for the second condition and wherein the first repository has a lower audit priority than the second repository, wherein in the sending of the first audit data collection to the first repository, the first audit data collection is for a less suspicious data access and is sent to a lower audit priority repository and in the sending of the second audit data collection to the second repository, the second audit data collection is for a more suspicious data access and is sent to a higher audit priority repository.

13. The non-transitory computer program product of claim 11, wherein one or more of the collected data access elements for the first condition define a first data identity and one or more of the collected data access elements for the second condition define a second data identity, wherein in the sending of the first audit data collection to the first repository, the first audit data collection is for a data access matching the first data identity and in the sending of the second audit data collection to the second repository, the second audit data collection is for a data access matching the second data identity.

14. The non-transitory computer program product of claim 13, wherein the first data identity is for data having a sensitivity level and the second data identity is for data having a higher data sensitivity level, wherein in the sending of the first audit data collection to the first repository, the first audit data collection is for a less sensitive data access and in the sending of the second audit data collection to the second repository, the second audit data collection is for a more sensitive data access.

15. The non-transitory computer program product of claim 11, wherein one or more of the collected data access element for the first condition defines an amount of data accessed and one or more of the collected data access element for the second condition defines a larger amount of data accessed, wherein in the sending of the first audit data collection to the first repository, the first audit data collection is for a smaller data access and in the sending of the second audit data collection to the second repository, the second audit data collection is for a larger data access.

* * * * *